(12) United States Patent
Tani et al.

(10) Patent No.: US 6,346,980 B1
(45) Date of Patent: Feb. 12, 2002

(54) GROUND POSITIONING SYSTEM APPLIED IN A DISTANCE MEASURING DEVICE

(75) Inventors: Nobuhiro Tani, Tokyo; Shuzo Seo; Shinichi Kakiuchi, both of Saitama; Kiyoshi Yamamoto, Tokyo, all of (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/669,756

(22) Filed: Sep. 26, 2000

(30) Foreign Application Priority Data

Sep. 27, 1999 (JP) .......................................... 11-272532

(51) Int. Cl.[7] .............................. G01C 3/08; G01C 9/00; G01B 11/26

(52) U.S. Cl. ................. 356/4.01; 356/5.01; 356/141.1; 702/152

(58) Field of Search .................. 356/4.01, 5.15, 356/141.1, 152.1; 702/152

(56) References Cited

U.S. PATENT DOCUMENTS

| | | | | |
|---|---|---|---|---|
| 4,497,065 A | * | 1/1985 | Tisdale et al. | |
| 5,200,793 A | * | 4/1993 | Ulich et al. | |
| 5,361,217 A | * | 11/1994 | Makimura et al. | 702/152 |
| 5,870,180 A | * | 2/1999 | Wangler | 356/5.05 |
| 5,949,529 A | * | 9/1999 | Dunne et al. | 356/4.01 |
| 6,108,076 A | * | 8/2000 | Hanseder | 356/141.1 |
| 6,137,566 A | * | 10/2000 | Leonard et al. | 356/141.1 |

FOREIGN PATENT DOCUMENTS

| | | |
|---|---|---|
| JP | 11-69280 | 3/1999 |
| WO | 97/01111 | 1/1997 |

OTHER PUBLICATIONS

Article entitled: "Design and Development of a Multi-Detecting Two-Dimensional Ranging Sensor", Measurement Science and Technology, Christie et al., vol. 6, pp. 1301–1308, 1995.

* cited by examiner

Primary Examiner—Stephen C. Buczinski
(74) Attorney, Agent, or Firm—Greenblum & Bernstein, P.L.C.

(57) ABSTRACT

A ground positioning system integrated with a distance measuring device that detects the distance from the device to a selected object for each pixel of the captured image of the selected object. The system, which also includes an azimuth sensor, calculates ground positioning coordinates of a selected object that correspond to a certain pixel of captured image using distance information, device ground positioning coordinates and device direction information.

7 Claims, 10 Drawing Sheets

GROUND POSITIONING SYSTEM APPLIED IN A DISTANCE MEASURING DEVICE

BACKGROUND OF THE INVENTION

1. Field of the Invention

The present invention relates to a distance measuring device by which a three-dimensional shape of a measurement subject, which is to be measured, is captured by a time-of-flight measurement.

2. Description of the Related Art

Conventionally, a distance measuring device that detects distance from the device to a measurement subject for each pixel of an imaging device is known in "Measurement Science and Technology" (S. Christie et al., vol. 6, p.1301–1308, 1995) or International Publication No. WO97/01111. The above distance measuring device radiates pulse modulated laser light beams to the measurement subject and receives the reflected light beams on the imaging device, a two-dimensional CCD sensor, and the received light beams are converted to electric signals at each of the photoelectric conversion elements of the CCD. The shuttering operation of the distance measuring device is so controlled as to correlate electric signals, which are detected at each of the photo-diodes, with distance information from the device to the measurement subject. From the electric signals, the distance information from the device to the measurement subject is detected at each pixel of the CCD, and the three-dimensional distance information that indicates the topography of the measurement subject is obtained. However, the three-dimensional distance information of the measurement subject is comprised only of relative distances from the device and the ground position of the measurement subject is not obtainable.

SUMMARY OF THE INVENTION

An object of the present invention is to provide a ground positioning system, which detects the ground position of a measurement subject, applied in the distance measuring device that detects the distance from the device to a measurement subject for each pixel of the captured image of the measurement subject.

According to the present invention, there is provided a ground positioning system applied in a distance measuring device that detects the distance from the distance measuring device to a measurement subject for each pixel of the captured image of the measurement subject. The ground positioning system comprises a ground position detecting processor, an azimuth detecting processor and a subject position calculating processor.

The ground position detecting processor detects the ground positioning coordinates of the distance measuring device. The azimuth detecting processor detects the direction of the distance measuring device. The subject position calculating processor calculates the ground positioning coordinates of a subject that correspond to a certain pixel of captured image using the distance value, the ground positioning coordinates and the direction of the distance measuring device.

Preferably, the ground positioning system further comprises an image indicating processor, an input processor, a map information search processor and a superimpose processor. The image indicating processor displays the captured image on a screen. The input processor is for selecting at least one pixel of the image, which is indicated on the screen by the image indicating processor. The map information search processor searches a piece of map information that corresponds to the ground positioning coordinates of a pixel which is selected by the input processor. The superimpose processor superimposes the piece of map information, which is searched by the map information search processor, in proximity to the selected pixel.

In a preferable example of the ground positioning system, the input processor may comprise a touch screen, the map information may comprise names of facilities that exist at locations indicated with the ground positioning coordinates and the ground positioning coordinates may comprise longitude and latitude.

Further, the preferred example of the ground positioning system comprises an inclination detecting processor that detects the inclination angle of the distance measuring device. The position calculating processor calculates the ground positioning coordinates of the subject. The coordinates corresponds to the distance value, that coincides with a certain pixel of the captured image, and the ground positioning coordinates, the direction and inclination angle of the distance measuring device.

The ground position detecting processor comprises a GPS (Global Positioning System) receiver so as to detect the ground positioning coordinates.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
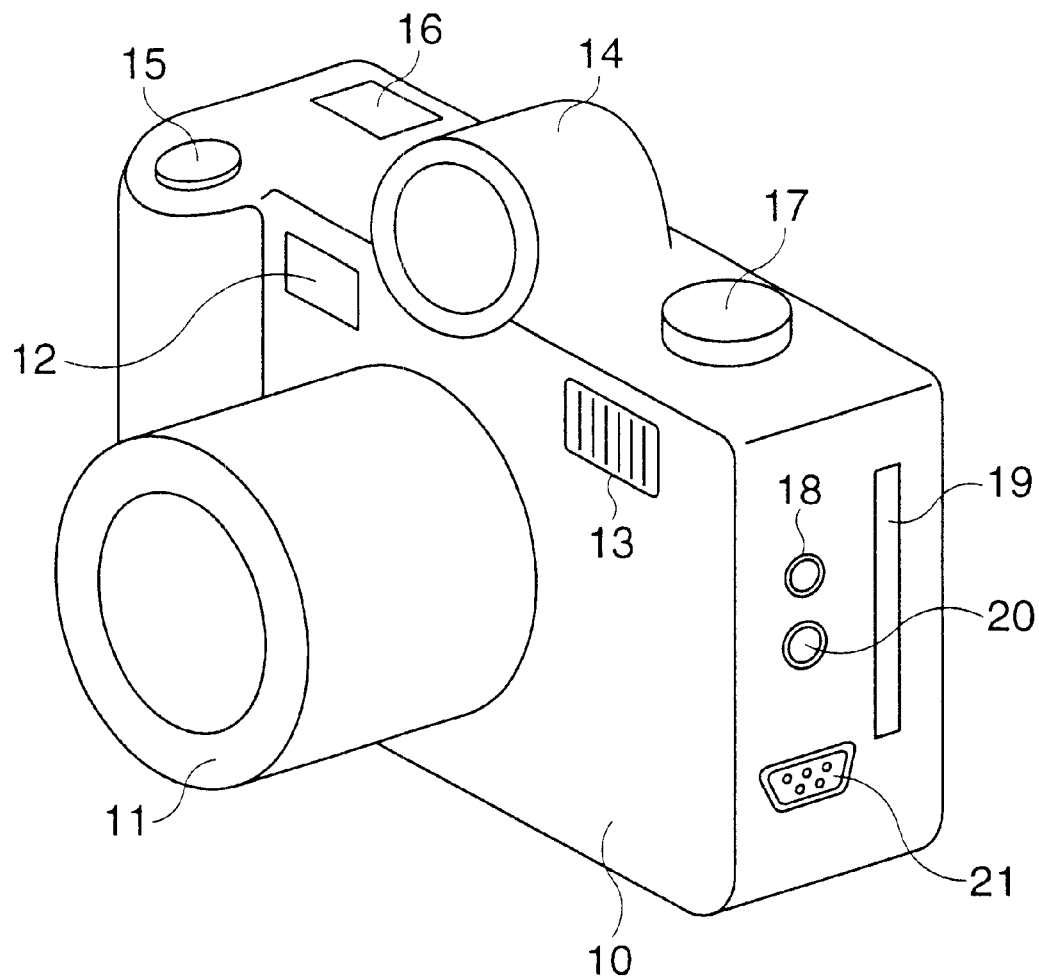
FIG. 1 is a perspective view showing a camera provided with a distance measuring device of the present embodiment of the present invention.

The present invention is described below with reference to embodiments shown in the drawings.

FIG. 1 is an external view of a camera type distance measuring device of a first embodiment of the present invention.

On a front surface of a camera body 10, a view-finder window 12 is provided toward the left-upper edge, adjacent to a photographing lens 11, and an electronic flash 13 is disposed toward the right-upper edge. On the upper surface of the camera body 10, a light emitting device 14, which radiates a laser beam is, mounted above the photographing lens 11. A release switch 15 and a liquid crystal display panel 16 are provided on the left side of the light emitting device 14 and a mode change dial 17 is provided on the right side of the device 14. On a side surface of the camera body 10, a card slot 19 is formed, into which a recording medium, such as an IC memory card, is insertable, and a video output terminal 20, an interface connector 21 and a connector 18 for a GPS (global positioning system) antenna are also provided. Further, on the backside of the camera body 10, an image indicating LCD panel 37 and a REC/PLAY mode switch 29, which alternatively selects a recording mode or playback mode (refer FIG. 10), are disposed.

Figure 2:
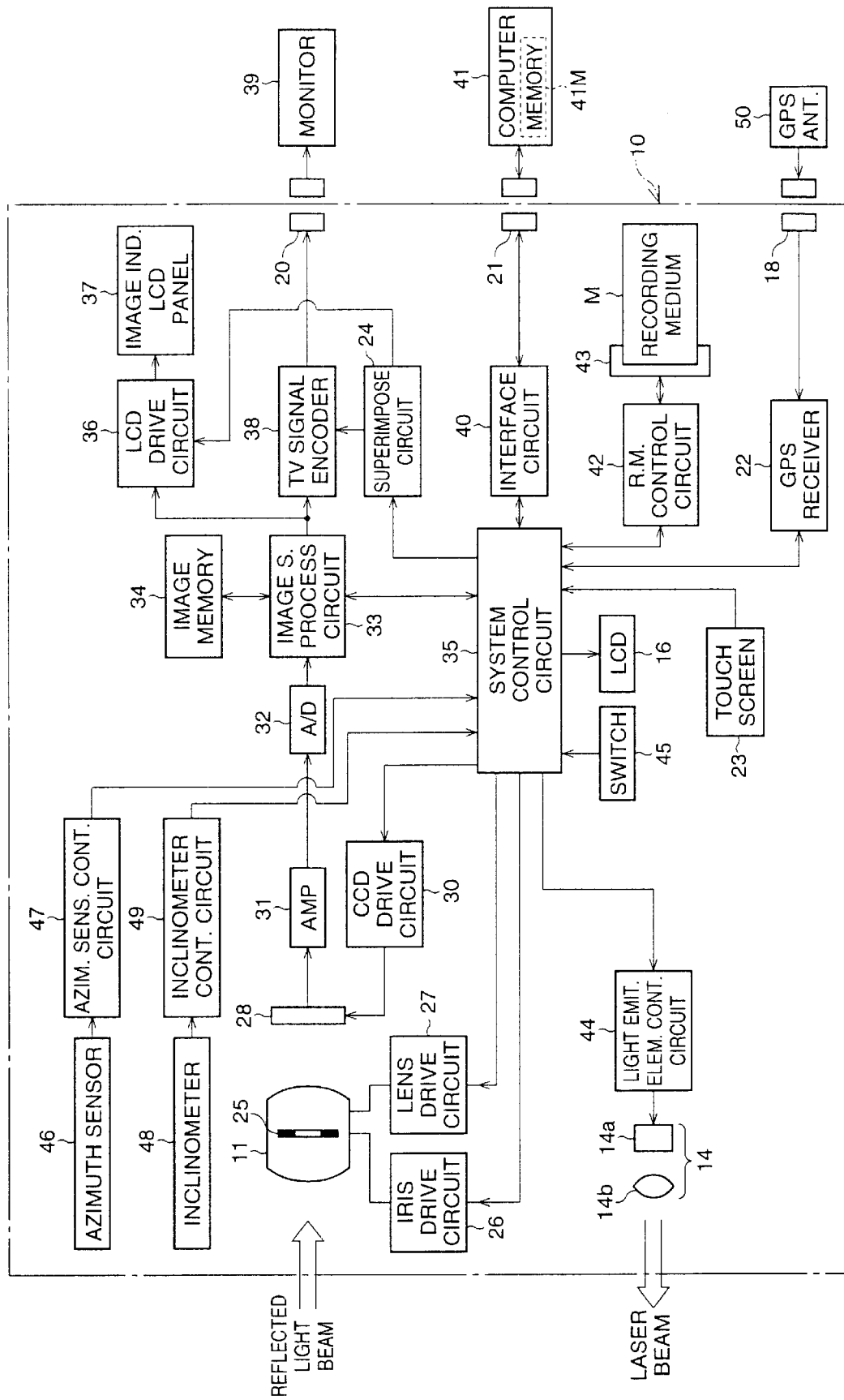
FIG. 2 is a block diagram showing an electrical construction of the camera of the present embodiment.

FIG. 2 is a block diagram showing an electrical construction of the camera of FIG. 1.

An aperture 25 is provided in the photographing lens 11. The opening degree of the aperture 25 is adjusted by an iris drive circuit 26. A focusing operation and a zoom operation of the photographing lens 11 are controlled by a lens drive circuit 27.

An imaging device (CCD) 28 is disposed on an optical axis of the photographing lens 11. A subject image is formed on the light receiving surface of the CCD 28 through the photographing lens 11, and an electric charge corresponding to the subject image is generated therein. An operation, such as an accumulating operation and a reading operation of the electric charge of the CCD 28, is controlled by a CCD drive circuit 30. An electric charge signal, i.e., an image signal, read from the CCD 29 is amplified by an amplifier 31, and is converted from an analog signal to a digital signal by an A/D converter 32. The digital image signal is subjected to a process, such as gamma correction, in the image signal process circuit 33, and is stored as digital image data in an image memory 34. The iris drive circuit 26, the lens drive circuit 27, the CCD drive circuit 30 and the image signal process circuit 33 are controlled by a system control circuit 35.

The digital image data are read from the image memory 34 and supplied to an LCD drive circuit 36, which is operated in accordance with the digital image data, so that an image corresponding to the digital image data is displayed on an image indicating LCD panel 37.

The digital image data read from the image memory 34 is also transmitted to a TV signal encoder 38, so that the digital image data can be transmitted to a peripheral monitor device 39, provided externally to the camera body 10, through the video output terminal 20. The system control circuit 35 is connected to an interface connector 21 via an interface circuit 40. Therefore, the digital image data read from the image memory 34 can also be transmitted to a computer 41 connected to the interface connector 21 via an interface cable. Further, the system control circuit 35 is connected to an image recording device 43 through a recording medium control circuit 42. Therefore, the digital image data read from the image memory 34 can be recorded in a recording medium M, such as an IC memory card, mounted in the image recording device 43.

A light emitting element control circuit 44 is connected to the system control circuit 35. The light emitting device 14 is provided with a light emitting element, such as laser diode (LD) 14a, and an illumination lens 14b. The operation of the light emitting element 14a is controlled by the light emitting element control circuit 44. The light emitting element 14a radiates a laser beam as a distance measuring light beam. The laser beam irradiates the whole of a measurement subject through the illumination lens 14b. The laser beam reflected by the measurement subject becomes incident on the photographing lens 11. By detecting the reflected laser beam with the CCD 28, information relating to the distance from the camera to the measurement subject is sensed at each pixel of the CCD 28.

The GPS antenna 50 is connected with the GPS receiver 22 through the connector 18 and the GPS receiver 22 is connected to the system control circuit 35. It can detect the longitude, latitude and altitude of the camera by receiving signals from satellites of the Global Positioning System (GPS) and send them to the system control circuit 35. Further, an azimuth sensor 46 and an inclinometer 48 are provided in the camera. The direction of the optical axis of the photographing lens 11 and angles of inclination of the camera body 10 are respectively obtained from the azimuth sensor 46 by an azimuth sensing control circuit 47 and from the inclinometer 48 by an inclinometer control circuit 49. The azimuth sensing control circuit 47 and the inclinometer control circuit 49 are connected to the system control circuit 35, and the direction and the angles of inclination are sent to the system control circuit 35.

A superimpose circuit 24 is connected to the LCD drive circuit 36, the TV signal encoder 38 and the system control circuit 35. The superimpose circuit 24 superimposes text information onto an image displayed on the image indicating LCD panel 37 or monitor 39. The superimposed text relates to the map information and is stored in a memory 41M of the computer 41. A piece of information, which is superimposed on the image displayed on the image indicating LCD panel 37, is read from the memory 41M and sent to the system control circuit 35 via the interface circuit 40.

The liquid crystal display panel 16, a touch screen 23 and a switch group 45, including the release switch 15, the mode change dial 17 and the REC/PLAY mode switch 29 are connected to the system control circuit 35. Note that the touch screen 23 is a transparent filmy cover placed over the screen of the LCD panel 37.

Figure 3:
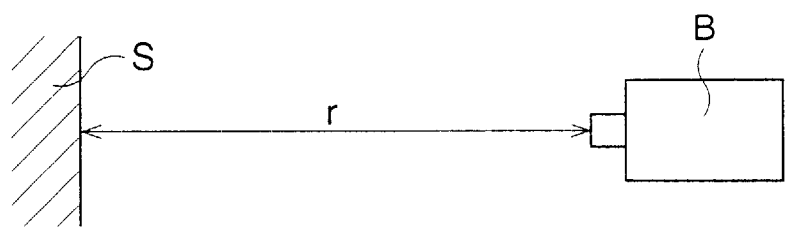
FIG. 3 is a view showing the principle behind the distance measurement.
Figure 4:
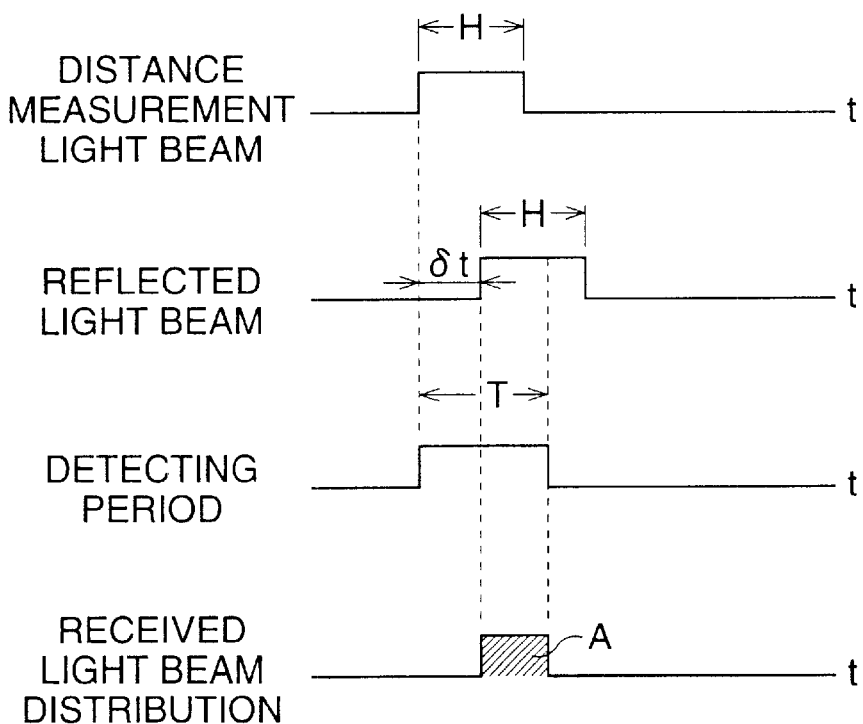
FIG. 4 is a timing chart showing a distance measuring light beam, a reflected light beam, a gate pulse and a distribution of an amount of a light beam received by a CCD.

With reference to FIGS. 3 and 4, the principle behind the distance measurement in the embodiment is described below. Note, in FIG. 4, the abscissa indicates time "t".

A distance measuring light beam output by a distance measurement device B is reflected by the measurement subject S, and the reflected light beam is sensed by a CCD (not shown). The distance measuring light beam is a pulse, the width of which is "H". Accordingly, the reflected light beam is a pulse, the width of which is "H", similarly to the distance measuring light beam. Therefore, a rise of the pulse of the reflected light beam occurs after a rise of the pulse of the distance measuring light beam by time δ·t (δ is a delay coefficient). Since the distance measuring light beam and the reflected light beam have both traveled a distance "r" between the distance measurement device B and the measured subject S, the distance "r" is represented as follows:

$$r = \delta \cdot t \cdot C / 2 \qquad (1)$$

wherein "C" is the speed of light.

For example, by setting a condition in such a manner that the reflected light beam can only be sensed from a rise of the pulse of the distance measuring light beam to a point prior to a fall of the pulse of the reflected light beam, i.e., by providing a gate pulse corresponding to a reflected light beam detecting period T, an amount "A" of received light from the reflected light beam becomes a function of the distance "r". Namely, the greater the distance "r" (or the greater the time δ·t), the less the received light amount A.

In the embodiment, by taking advantage of the principle described above, the received light amount A is sensed using each of the photo-diodes of the CCD 28, the distance from the camera body 10 to each point on the surface of the measurement subject S is sensed, and data relating to the three-dimensional image, which indicates the topography of the measurement subject S, can be obtained.

Figure 5:
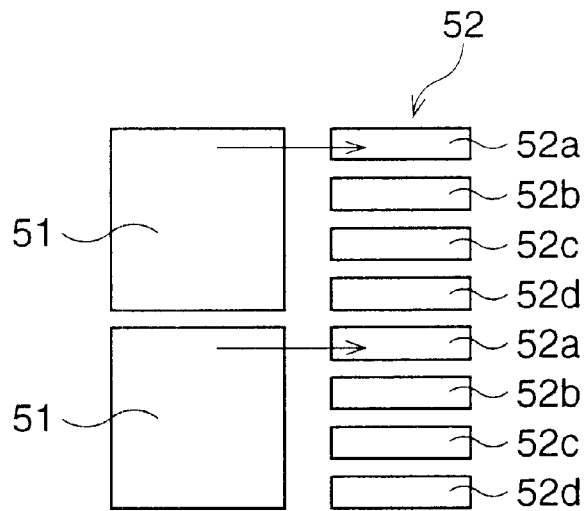
FIG. 5 is a plan view showing the disposition of photo-diodes and a vertical transfer unit, which are provided in the CCD of the present embodiment.
Figure 6:
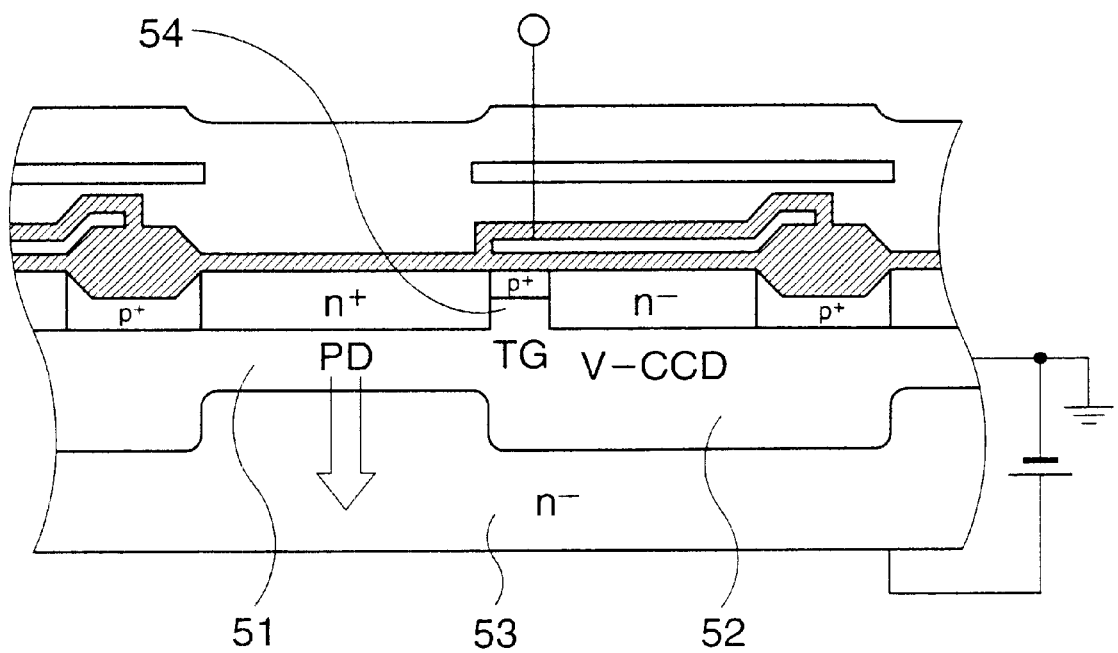
FIG. 6 is a sectioned elevational view of the CCD.

FIG. 5 is a plan view showing the disposition of the photo-diodes 51 and a vertical transfer unit 52, which are provided in the CCD 28. In practice a multitude of photo-diodes 51 are arranged in a matrix and a corresponding vertical transfer unit 52 is disposed beside each vertical column of photo-diodes 51. FIG. 6 is a sectioned elevational view of the CCD 28 in which the CCD 28 is cut by a plane perpendicular to a substrate 53. The CCD 28 is an interline CCD of vertical overflow drain (VOD) type, in which unwanted charge is discharged to the substrate 53.

The photo-diodes 51 and the vertical transfer unit 52 are formed along a surface of the n-type substrate 53. A plurality of photo-diodes 51 are two-dimensionally disposed in a matrix arrangement, and the vertical transfer unit 52 is disposed adjacent to the photo-diodes 51, parallel to rows extending in a vertical direction in FIG. 5. The vertical transfer unit 52 has four vertical transfer electrodes 52a, 52b, 52c and 52d, which correspond to each of the photo-diodes 51. Therefore, in the vertical transfer unit 52, four potential wells can be formed, so that a signal charge is output from the CCD 28 by controlling a depth of the wells, as is well known. Note that the number of the vertical transfer electrodes can be changed, depending upon the requirement of the CCD 28.

The photo-diodes (PD) 51 and the vertical transfer unit (V-CCD being signal charge holding unit) 52 are disposed in a p-type well formed on a surface of the substrate 53. The p-type well is completely depleted due to an inverse bias voltage applied between the p-type well and the n-type substrate 53. In this state, electric charge is accumulated in the photo-diodes 51, and an amount of the electric charge corresponds to an amount of an incident light beam, which is the reflected light beam reflected by the measurement subject. When a substrate voltage is changed to a value greater than a predetermined value, electric charge accumulated in the photo-diodes 51 is discharged to the substrate 53. Conversely, when an electric charge transfer signal, which is a voltage signal, is applied to a transfer gate (TG) 54, the electric charge accumulated in the photo-diodes 51 is transferred to the vertical transfer unit 52. Namely, after the electric charge is discharged to the substrate 53 by the electric charge discharging signal, the signal charge accumulated in the photo-diode 51 is transferred to the vertical transfer unit 52 by the electric charge transfer signal. By repeating the discharge and the transfer, an electronic shuttering operation is performed.

Figure 7:
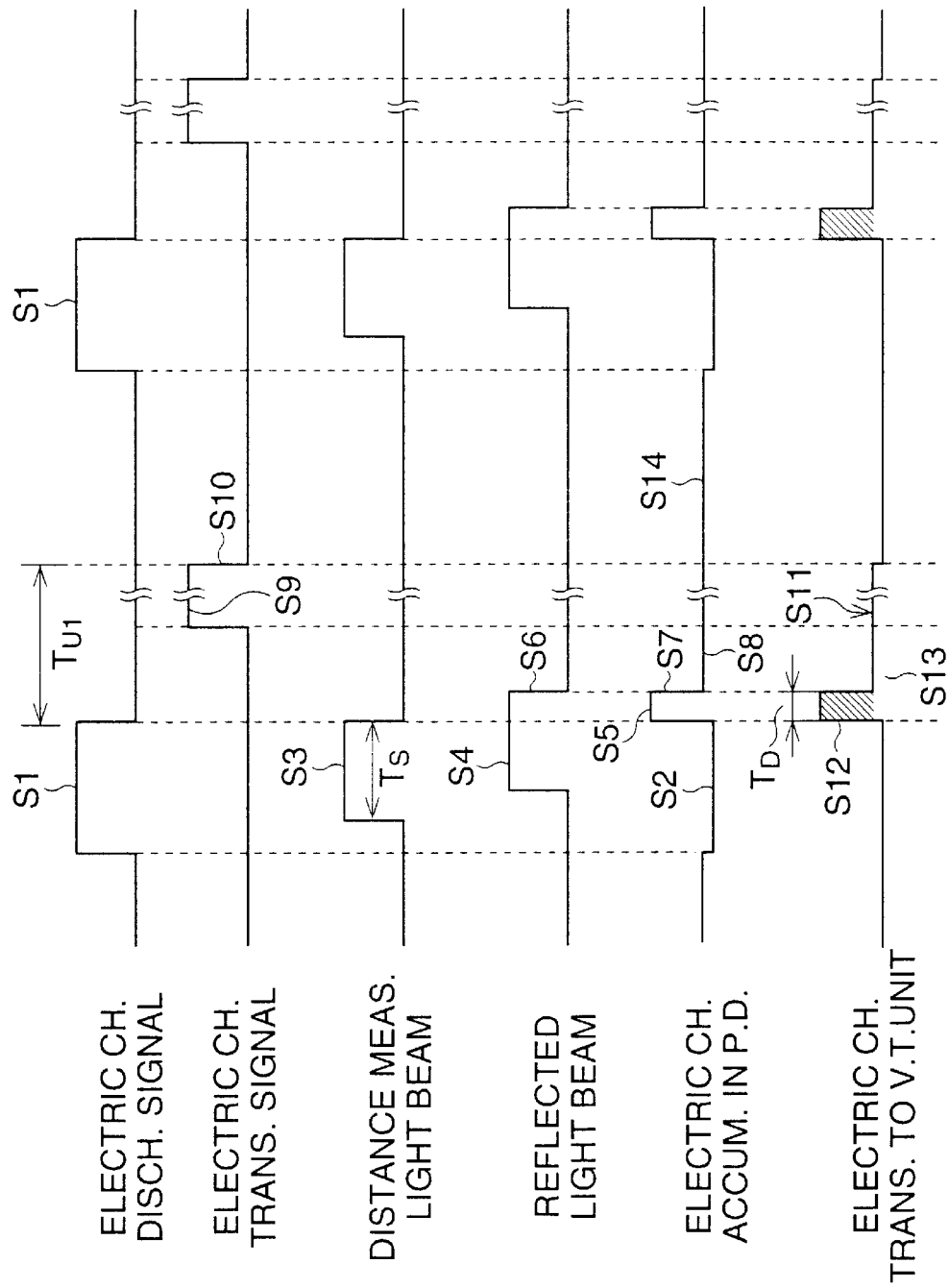
FIG. 7 is a timing chart of a distance information sensing operation by which data, corresponding to a distance from a camera body to each point on the surface of a measurement subject, is sensed in the present embodiment.

FIG. 7 is a timing chart of a distance information sensing operation by which data, corresponding to the distance from the camera body 10 to each point on a surface of the measurement subject, is sensed. The distance information sensing operation is described below with reference to FIGS. 1, 2, 5, 6 and 7. Note that the timing chart of the distance information sensing operation in the present embodiment is slightly different from the timing chart of the distance measurement principle, which was described above with reference to FIG. 4. Namely, the timing chart of the present embodiment is set so as to sense the reflected light beam from a point subsequent to the rise of the reflected light beam pulse to a point subsequent to the fall. By this manner, the noise component due to ambient daylight may be reduced, though the principles of the above distance measurement means are basically the same.

In synchronization with an output of a vertical synchronizing signal (not shown), an electric charge discharging signal (a pulse signal) S1 is output, so that unwanted charge, which is accumulated in the photo-diodes 51, is discharged to the substrate 53. The electric charge value, while the pulse signal S1 is output, is indicated as S2 in the chart. After the electric charge discharging signal S1 is output, the light emitting device 14 is actuated, and thus a distance measuring light beam S3, which is a pulsed beam having a constant width $T_S$, is output therefrom. A period for outputting the distance measuring light beam S3 or the width of the pulse beam is modulated according to a requirement. In the present embodiment, the distance measuring light beam S3 is modulated to be completed approximately simultaneously with completion of the output of the electric charge discharging signal S1.

The distance measuring light beam S3 is reflected by the measurement subject, and enters the CCD 28 as a reflected light beam S4. When the output of the electric charge discharging signal S1 ends, the electric charge for incident light, which comprises the reflected light beam S4 and ambient daylight, starts on each of the photo-diodes and a signal charge S5 is sensed. When an incident of the reflected light beam S4 is completed, i.e. after the fall indicated by the reference sign S6, the photo-diodes only generate signal charge S8 due to ambient daylight.

Then an electric charge transfer signal S9 is output to the vertical transfer electrodes 52a, and an electric charge accumulated in the photo-diodes 51 is transferred to the vertical transfer unit 52. The operation of transferring the accumulated electric charge in the photo-diodes 51 ends with the fall S10, which is a termination of the output of the electric charge transfer signal S9. Namely, a signal charge S11 of which electric signal accumulation was started just after the completion of the electric charge discharging signal output and terminated just after the completion of the output of the electric transfer signal S9, is transferred to the vertical transfer unit 52, while the photo-diodes continue to accumulate electric signals S14 due to ambient daylight.

Thus during a period $T_{U1}$ from the end of the output of the electric charge discharging signal S1 to the end of the output of the electric charge transfer signal S9, a signal charge S11, corresponding to distances from the camera body 10 to the measurement subject and the ambient daylight is accumulated in the photo-diodes 51. Namely, the signal charge S12, a hatched portion of signal charge S11, corresponds to the distances from the camera body 10 to the measurement subject, while a residual portion S13 of the signal charge S11 is the result of ambient daylight.

When a predetermined time has elapsed since the output of the electric charge transfer signal S9, a subsequent electric charge discharge signal is output, so that the signal charge S14, an electric charge accumulated in the photo-diodes after the signal charge transfer to the vertical transfer unit 52, is discharged to the substrate 53. Subsequently, another signal charge is accumulated in the photo-diodes 51. Then, similarly to the above description, when the electric charge accumulation period $T_{U1}$ has again elapsed, the signal charge S11 is transferred to the vertical transfer unit 52.

The transferring operation of the signal charge S11 to the vertical transfer unit 52 is repeatedly performed until the next vertical synchronizing signal (not shown) is output. Thus, the signal charge S11 is integrated in the vertical transfer unit 52. The signal charge S11 integrated for one field period, which is between two vertical synchronizing signals, corresponds to distance information of the measurement subject, on condition that the measurement subject is stationary for the period between the two vertical synchronizing signals. Note that an amount of the signal charge S13 is small enough to be omitted when it is compared with that of the signal charge S12, thus the signal charge S11 can be regard as the signal charge S12.

The detecting operation of the signal charge S11 described above is carried out in all of the photo-diodes 51 provided in the CCD 28. As a result of the detecting operation for one field period, the distance information sensed by the photo-diodes 51 is held in each corresponding vertical transfer unit 52, which is located adjacent to each column of photo-diodes 51. The distance information is output from the CCD 28 by a vertical transferring operation of the vertical transfer units 52 and a horizontal transferring operation of a horizontal transfer unit (not shown).

Next, the distance information sensing operation in the present embodiment is explained with reference to FIG. 8, which describes a flow chart of the operation. Note that, the distance information sensing operation is executed in the recording mode, which is set by the REC/PLAY mode switch 29.

When it is recognized in Step 101 that the release switch 15 is fully depressed, Step 102 is executed in which the vertical synchronizing signal is output and a distance measuring light beam control is started. Namely, the light emitting device 14 is driven so that the distance measuring light beam S3 is intermittently output as a pulsed beam. Then, Step 103 is executed so that a sensing operation control of the CCD 28 is started. Namely, the distance information sensing operation described with reference to FIG. 7 is started, and thus the electric charge discharging signal S1 and the electric charge transfer signal S9 are alternately output, so that the signal charge S11 of the distance information is integrated in the vertical transfer unit 52.

In Step 104, it is determined whether one field period has elapsed since the beginning of the distance information sensing operation, i.e., whether a new vertical synchronizing signal has been output. When one field period has passed, the process goes to Step 105 in which the signal charge S11 of the distance information is output from the CCD 28. The signal charge S11 is then temporarily stored in the image memory 34 in Step 106.

In Step 107, the distance measuring light beam control is turned OFF, and thus the light emitting operation of the light emitting device 14 is terminated. In Step 108, a calculation process of the distance measurement (D) data is performed by using the distance information. Then the D data is output and temporarily stored in the image memory 34 in Step 109.

In Step 110, a normal photographing operation (i.e., CCD video control) is turned ON. The image of the measurement subject, which corresponds to the distance information, is then sensed as image data. The image data is temporarily stored in the image memory 34 at Step 111.

In Step 112, the direction of the optical axis of the photographing lens 11 is detected with the azimuth sensor 46, and in Step 113, the inclination of the camera body 10 is sensed by the inclinometer 48. In step 114, the ground position of the camera, which is indicated with the longitude, latitude and altitude of the camera, is obtained. The ground positioning coordinate, such as the longitude, latitude and altitude are analyzed from the signals, which are transmitted from the satellites for the global positioning system (GPS) and received by the GPS antenna. In Step 115, the distance measurement data and the image data, which respectively stored in the image memory 34 in Step 109 and Step 111, are recorded in the recording medium M as a single file with data indicating the direction, the inclination and the ground positioning coordinates (longitude, latitude, altitude) of the camera. This distance information sensing operation then ends.

Next, with reference to FIG. 7, the calculation executed in Step 108 is described.

It is supposed that the measurement subject of reflectance R is illuminated and an image of the measurement subject is formed on the CCD 28 while regarding the measurement subject to be a secondary light source. At this time, an output Sn, which is obtained by integrating an electric charge generated in a photo-diode for an electric charge accumulation period "t", is indicated as follows:

$$Sn = k \cdot R \cdot I \cdot t \qquad (2)$$

wherein "k" is a proportional coefficient, which is varied in accordance with an F-number and a magnification of the photographing lens. "I" is a luminance of the measurement subject while regarding the subject as a secondary light source.

As shown in FIG. 7, it is supposed that the electric charge accumulation period is $T_{U1}$, the pulse width of the distance measuring light beam S3 is $T_S$, a pulse width of the signal charge S12 of the distance information is $T_D$, and the electric charge accumulation period is repeated N times (a predetermined number of times) for one field period. An output $SM_{10}$ of the CCD is:

$$SM_{10} = \sum k \cdot R \cdot I \cdot T_D \qquad (3)$$
$$= k \cdot N \cdot R \cdot I \cdot T_D,$$

wherein the pulse width $T_D$ is indicated as follows:

$$T_D = \delta \cdot t \qquad (4)$$
$$= 2r/C.$$

Therefore, the distance r, which is from the camera to the measurement subject, is described in the following form:

$$r = C \cdot SM_{10}/(2 \cdot k \cdot N \cdot R \cdot I) \qquad (5)$$

Figure 9:
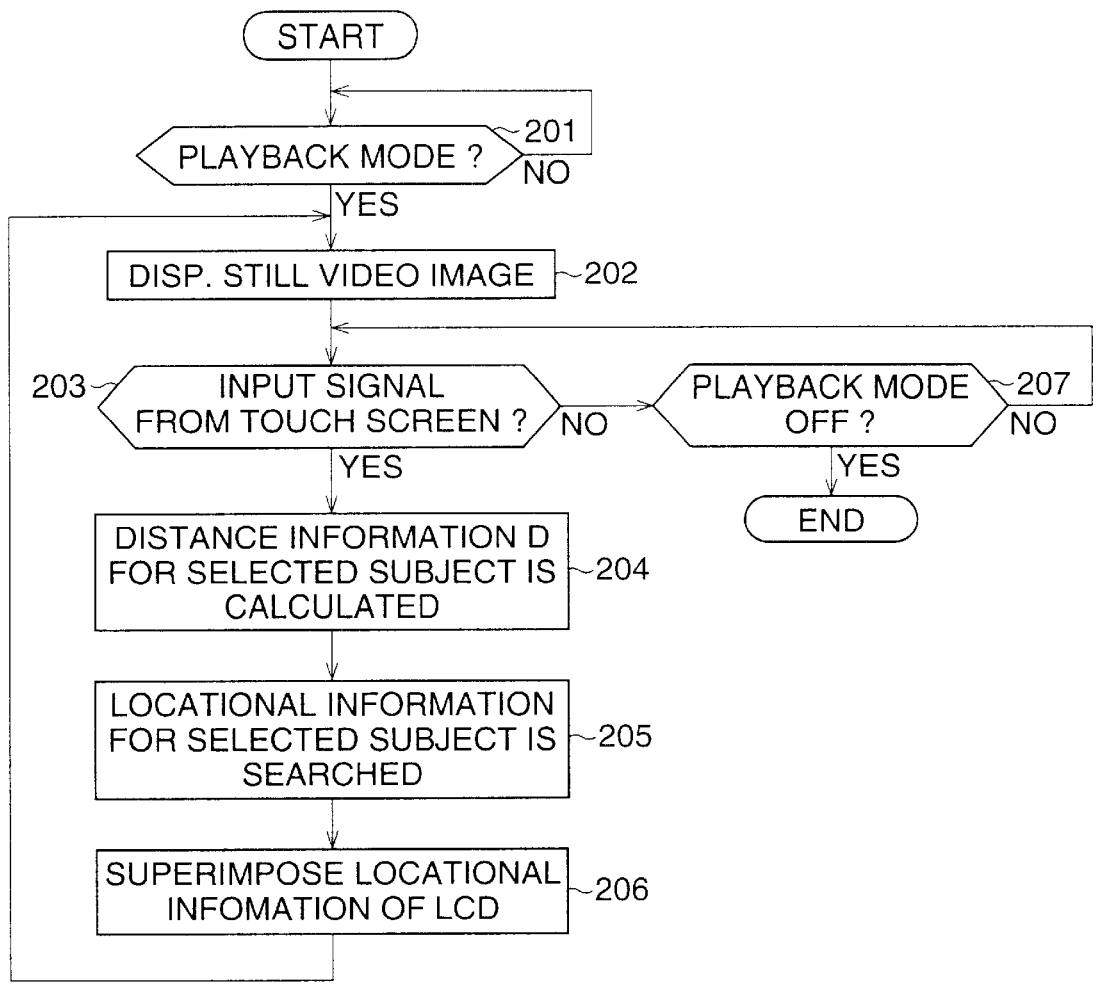
FIG. 9 shows the flowchart of the program executed in the playback mode.

FIG. 9 describes a flow chart of a process executed in the camera when the REC/PLAY mode switch is set to the playback or PLAY mode, in which the photographed still video image of the measurement subject is displayed on the image indicating LCD panel 37 and the ground positioning coordinates of the measurement subject are detected.

When it is determined that the REC/PLAY mode switch is set to the playback or PLAY mode, in Step 201, the process succeed to Step 202. In Step 202, the still video image data stored in the recording medium M in Step 115 of FIG. 8 is read and displayed on the image indicating LCD panel 37.

In Step 203, it is determined whether an input signal from the touch screen 23 for indicating and selecting a particular subject in the displayed image exists. If it is determined that there is no input signal from the touch screen 23, Step 207 determines whether the REC/PLAY mode switch is switched to the recording mode and the playback mode is canceled. If the mode is still set to playback mode, the process returns to Step 203 and this cycle continues until an input signal from the touch screen 23 is input or the REC/PLAY mode switch is switched to the recording mode. When it is determined that the REC/PLAY mode switch is switched to the recording mode and the playback mode is canceled in Step 207, this routine ends.

Figure 10:
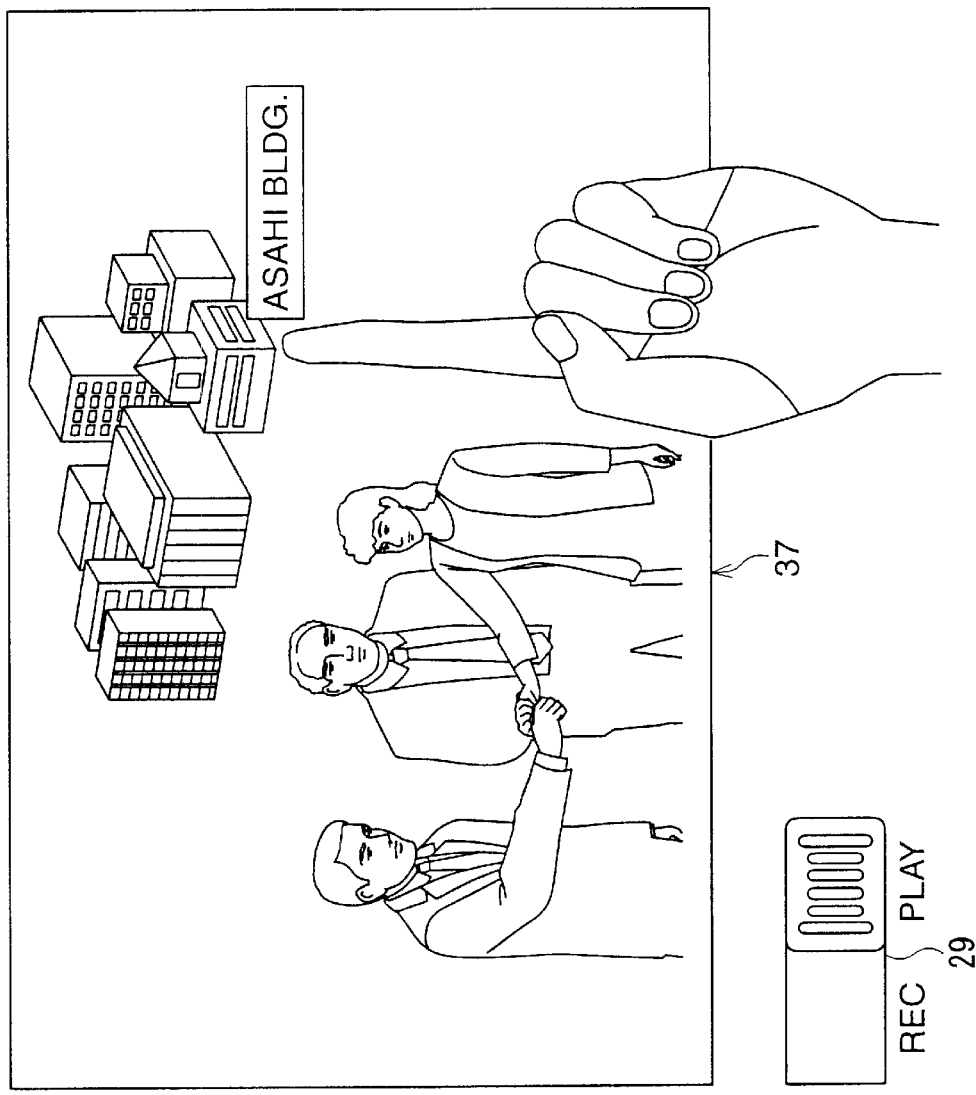
FIG. 10 illustrates a disposition of the image indicating LCD panel, the REC/PLAY mode switch on the backside of the camera body and an example of a display on the LCD.

The surface of the image indicating LCD panel 37 is overlaid with the filmy touch screen 23. When a certain position of the screen corresponding to a particular point or part of the image is touched by a finger or pointed with a pointing pen, as shown in FIG. 10, the above touched or pointed position of the touch screen is detected and corresponding address of the screen is obtained. When a particular subject is indicated with the finger or with the pointing pen, and a signal from the touch screen is input in Step 203, then the process succeed to Step 204. Note that FIG. 10 illustrates the image indicating LCD panel 37 and the REC/PLAY mode switch 29 provided on the backside surface of the camera body 10.

In Step 204, the pixel corresponding to the above address of the touch screen is obtained. Then the average of distance data is calculated for pixels within a certain proximity to the pixel. The average of the distance data is regarded as distance information D that represents a distance for a selected subject, which is indicated by a finger or with a pointing pen.

Figure 8:
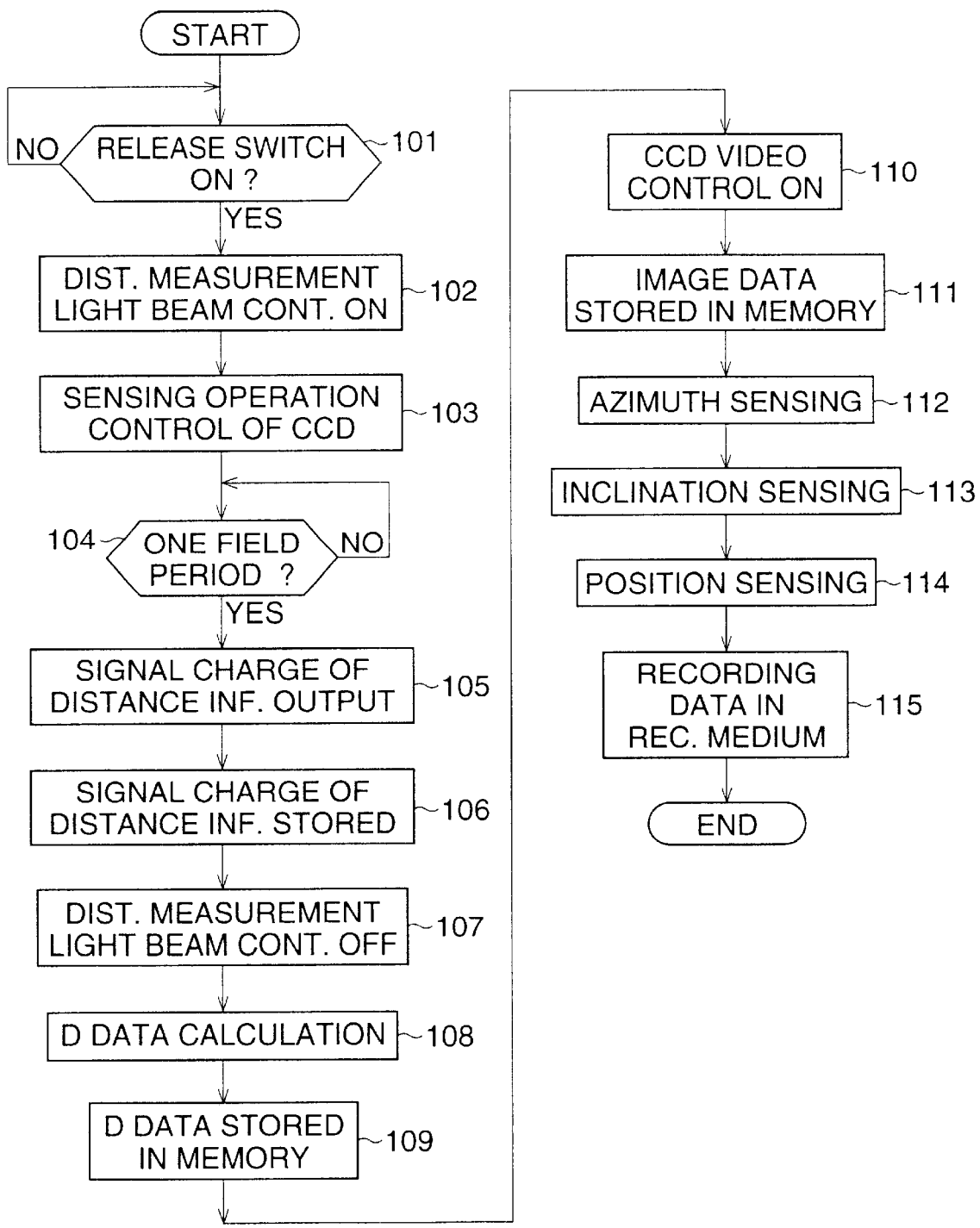
FIG. 8 shows the flowchart of the distance information sensing operation of the present embodiment.

In Step 205, the ground position of the selected subject or the absolute position of the selected subject on the map is obtained from the distance information D, the ground positioning coordinates, the direction data and inclination data, which are respectively detected in Step 112 and 113 of FIG. 8. Then locational information for the selected subject is searched for and read out from the map data stored in the memory 41M of the computer 41 (see FIG. 2), with reference to the ground position coordinates of the selected subject. Additional locational information may be the name or address of the facilities, and so on, which exist at the position indicated by the above ground positioning coordinates. Namely, a user may know the name or the address of the facilities by selecting a particular subject on the screen. In Step 206, the locational information of the selected subject is superimposed on the image of the measurement subject displayed on the image indicating LCD panel 37, and it is displayed adjacent to the selected subject. Then the process returns to Step 202, and repeatedly executed until the REC/PLAY mode switch is switched to the recording (REC) mode.

FIG. 11 through FIG. 14, refer to the explanation of the calculation executed in Step 205 so as to obtain the ground position of the selected subject are explained.

Figure 11:
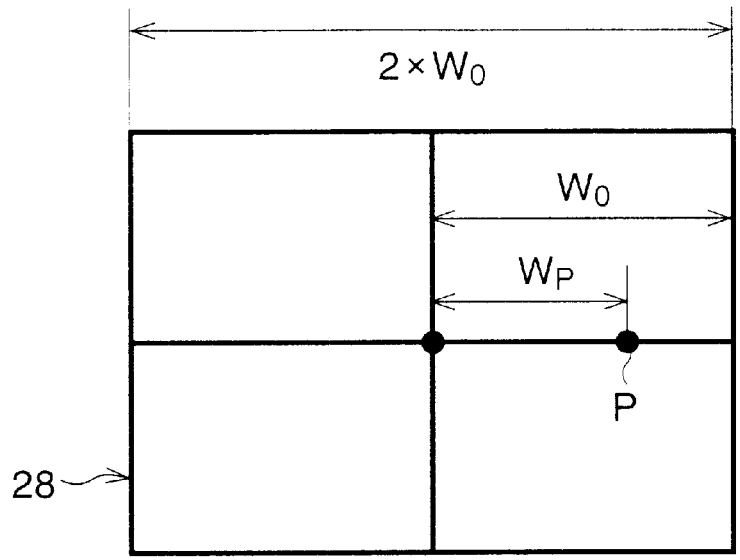
FIG. 11 indicates a disposition of a selected pixel in the CCD.
Figure 12:
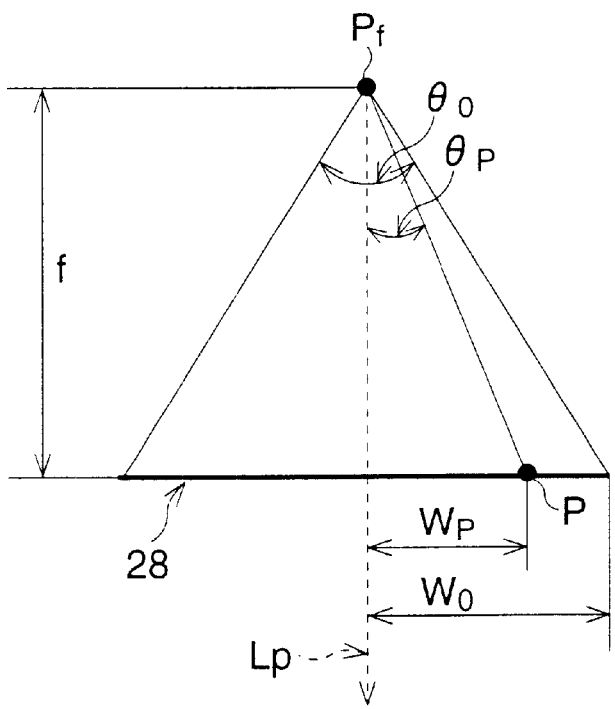
FIG. 12 illustrates the relation between the angle of view and the imaging surface of the CCD.

FIG. 11 is a front view of the CCD 28. The width of the CCD 28 is $2 \times W_0$ and the point P represents a pixel transversely apart from the center of the imaging surface of the CCD 28, at a distance of $W_P$. FIG. 12 shows the disposition of the imaging surface of the CCD 28 and the focal point $P_f$, where f and $\theta_0$ represent the focal length and the angle of view respectively. The line segment $PP_f$, which is between the point P and the focal point $P_f$, is at an angle of $\theta_P$ with the optical axis $L_P$ of the camera. The angle of view $\theta_0$ and the angle $\theta_P$ are then described as follows:

$$\theta_0 = 2 \times \tan^{-1}(W_0/f) \tag{6}$$

$$\theta_P = \tan^{-1}(W_P/f). \tag{7}$$

Figure 13:
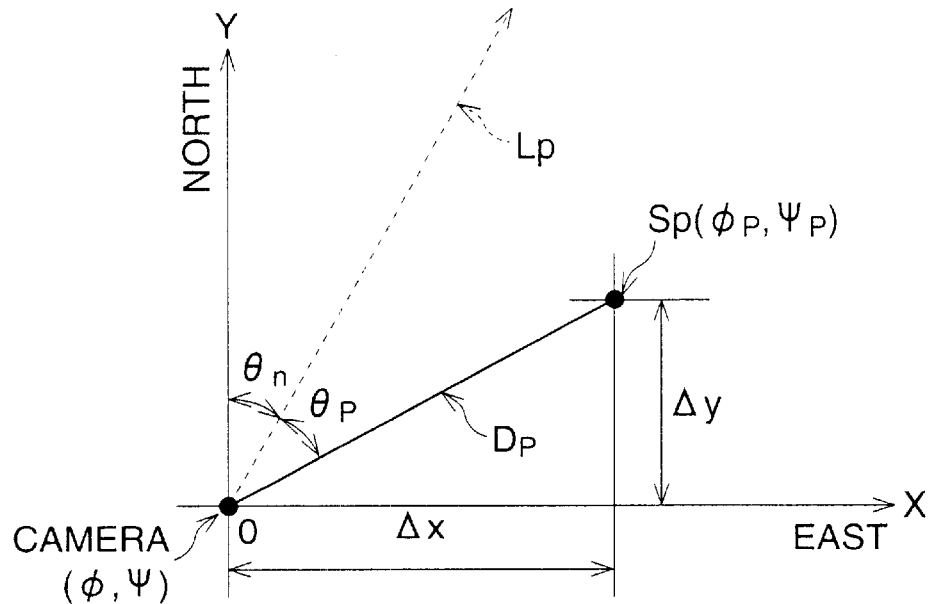
FIG. 13 shows a disposition of the optical axis and the selected subject, with two-dimensional Cartesian coordinates in the horizontal plane, and the coordinate system whose origin is identical to the camera body.

FIG. 13 illustrates the position of the subject $S_P$, which corresponds to the pixel at the point P of the CCD 28, in the horizontal plane. The origin O of the coordinate system O-XY is taken at the focal point $P_f$, the X-axis is directed to the east direction and Y-axis to the north direction. The half line (broken line) $L_P$ is the optical axis of the camera and is identical to the direction of camera. The coordinates ($\Delta x$, $\Delta y$) of the subject $S_P$, in the O-XY coordinates system, is described in the following:

$$\Delta x = D_P \times \sin(\theta_n + \theta_P), \tag{8}$$

$$\Delta y = D_P \times \cos(\theta_n + \theta_P). \tag{9}$$

Where $\theta_n$ represents an angle between the optical axis $L_P$ and the Y axis, and $D_P$ represents a distance from the focal point to the subject $S_P$, which corresponds to the pixel at the point P of the CCD 28. Note that the distance $D_P$ corresponds to the distance information D, which indicates an average of distance data around the pixel at P.

When the longitude and the latitude of the camera (or the origin O) obtained by the GPS are $\phi$ and $\psi$, the coordinates of the subject $S_P$, which are respectively represented by $\phi_P$ and $\psi_P$, are calculated with $$\phi_P = \phi + \alpha \cdot \Delta x, \tag{10}$$

$$\psi_P = \psi + \beta \cdot \Delta y, \tag{11}$$

where, $\alpha$ and $\beta$ are coefficients, at ($\phi$, $\psi$), for transforming distances in X and Y direction to angles of the longitude and the latitude respectively.

Therefore, with reference to the equations (7) through (11), the longitude $\phi_P$ and the latitude $\psi_P$ of the subject $S_P$ are obtained by the following form:

$$\phi_P = \phi + \alpha \cdot D_P \cdot \sin(\theta_n + \tan^{-1}(W_P/f)), \tag{12}$$

$$\psi_P = \psi + \beta \cdot D_P \cdot \cos(\theta_n + \tan^{-1}(W_P/f)) \tag{13}$$

Figure 14:
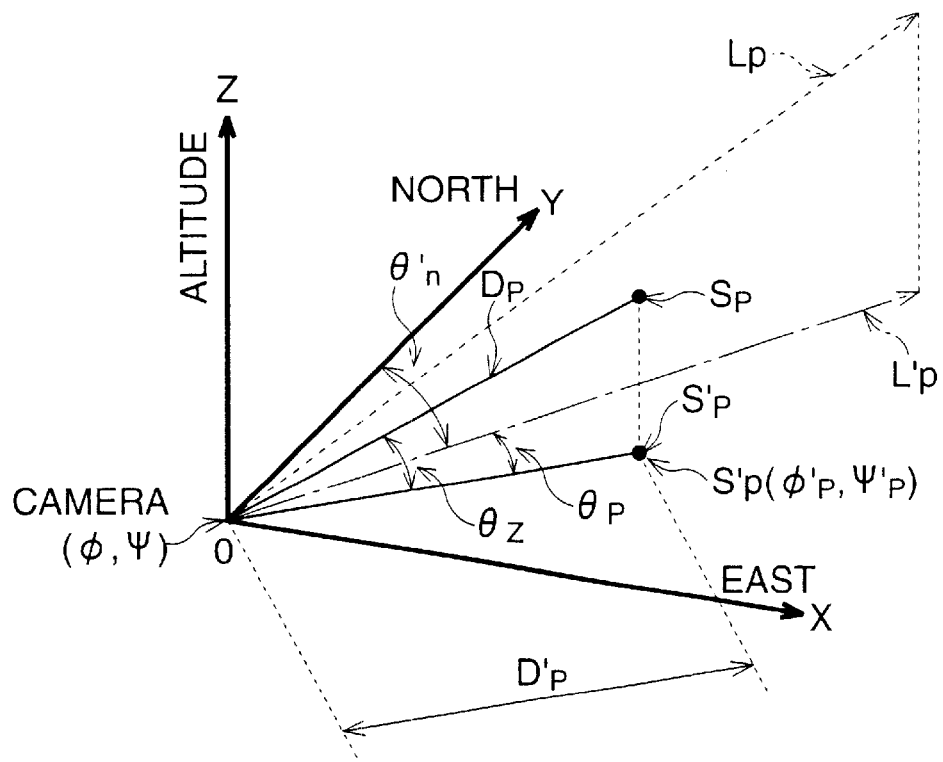
FIG. 14 illustrates a three-dimensional disposition of the optical axis and the selected subject with Cartesian coordinates with the origin of the axes at the camera.

Next, with reference to FIG. 14, the method of calculating the longitude and the latitude of the subject $S_P$, that is the coordinates ($\phi_P'$, $\psi_P'$) for the inclined camera, is explained.

FIG. 14 schematically illustrates a three dimensional disposition of the subject $S_P$ corresponding to the pixel at the point P of the CCD 28 and the focal point or the origin O of the coordinate system O-XYZ. The X-axis is directed to the east and the Y-axis to the north. Further, the Z-axis is directed to the vertical direction. The line segment (broken line) $L_P$ indicates the direction of the camera and is identical to the optical axis of the camera. The point $S_P'$ is the projection of the subject $S_P$ on the XY plane, which is a horizontal plane. The line $L_P'$ is the projection of the optical axis $L_P$ on the XY plane. The distance $D_P$ corresponds to the length of the segment $OS_P$, and $D_P'$ corresponds to the length of the segment $OS_P'$, which is the projection of the segment $OS_P$ on the XY plane. The angle $\theta_Z$ indicates the angle between the segment line $OS_P$ and the segment line $OS_P'$. In this example, the angle is identical to the angle of the optical axis $L_P$ to the XY plane or the horizontal plane; namely, it indicates inclination or inclined angle of the camera body 10. The angle $\theta_P$ is an angle between the segment line $L_P'$ and the segment line $OS_P'$, and the angle $\theta_n'$ is an angle between the segment line $L_P'$ and the Y-axis.

The coordinates ($\phi_P'$, $\psi_P'$) of the subject $S_P$, which corresponds to the point P, is derived by substituting $D_P'$ to $D_P$ and $\theta_n'$ to $\theta_n$ of the equation (12) and (13). With the substitution, the equation (12) and (13) yield to $$\phi_P' = \phi + \alpha \cdot D_P' \cdot \sin(\theta_n' + \tan^{-1}(W_P/f)), \tag{14}$$

$$\psi_P' = \psi + \beta \cdot D_P' \cdot \cos(\theta_n' + \tan^{-1}(W_P/f)), \tag{15}$$

where $D_P'$ is $$D_P' = D_P \times \cos \theta_Z. \tag{16}$$

Thus, the coordinates ($\phi_P'$, $\psi_P'$) are calculated by the following form:

$$\phi_P' = \phi + \alpha \times D_P \times \cos \theta_Z \times \sin(\theta_n' + \tan^{-1}(W_P/f)), \tag{14}$$

$$\psi_P' = \psi + \beta \times D_P \times \cos \theta_Z \times \cos(\theta_n' + \tan^{-1}(W_P/f)) \tag{15}$$

As described above, according to the present embodiment, the longitude and latitude of a selected subject in a captured image is obtainable. Further, when applying the map data, a database of related or locational information, such as the name and/or address, and so on, of the facility corresponding to the above selected subject is also accessible and may be displayed on the screen.

In the present embodiment, the camera refers to the map data stored in the memory 41M of the computer 41 and it is transferred through the interface cable connected between the camera and the computer 41. However, the map data may be stored in a memory provided in the camera or in the recording medium M. Further, the image data, distance data, direction data, ground positioning coordinate data and the inclination data may be transferred to the computer 41 so that the selection of the subject is carried out using the image on the display of the computer 41 and selecting the subject with the mouse pointer. The locational information of the selected subject may also be displayed on the computer display.

In the present embodiment, the GPS antenna 50 is described as a peripheral device and connected to the camera body 10 with a cable. It may also be installed inside the camera body 10.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 11-272532 (filed on Sep. 27, 1999) which is expressly incorporated herein, by reference, in their entireties.

What is claimed is:

1. A ground positioning system applied in a distance measuring device that detects distances from said distance measuring device to a measurement subject for each pixel of a captured image of said measurement subject, and said ground positioning system comprising:

a ground position detecting processor that detects the ground positioning coordinates of said distance measuring device;

an azimuth detecting processor that detects the direction of said distance measuring device; and a subject position calculating processor that calculates the ground positioning coordinates of a subject that corresponds to a certain pixel of said captured image from said distance, said ground positioning coordinates of said distance measuring device, and said direction.

2. A system according to claim 1, comprising:

an image indicating processor that indicates said image on a screen;

an input processor for selecting at least one pixel of said image, which is indicated on said screen by said image indicating processor;

a map information search processor that searches a piece of map information that corresponds to said ground positioning coordinates of a selected pixel, which is selected by said input processor; and a superimpose processor that superimposes a piece of said map information, which is searched by said map information search processor, in proximity to said selected pixel.

3. A system according to claim 2, wherein said input processor comprises a touch screen.

4. A system according to claim 2, wherein said map information comprises names of facilities that exist at locations indicated with said ground positioning coordinates.

5. A system according to claim 1, wherein said ground positioning coordinates comprise longitude and latitude.

6. A system according to claim 1, comprising an inclination detecting processor that detects an inclination angle of said distance measuring device, and wherein said position calculating processor calculates said ground positioning coordinates of said subject, which corresponds to a certain pixel of said captured image, from said distances that correspond to said certain pixel of said captured image, said ground positioning coordinates of said distance measuring device, said direction and said inclination angle of said distance measuring device.

7. A system according to claim 1, wherein said ground position detecting processor comprising a GPS (Global Positioning System) receiver so as to detect said ground positioning coordinates.

* * * * *